United States Patent [19]

Fujii

[11] Patent Number: 5,099,230
[45] Date of Patent: Mar. 24, 1992

[54] METHOD OF AND APPARATUS FOR FORMING OUTLINE CHARACTER

[75] Inventor: Katuyasu Fujii, Tachikawa, Japan

[73] Assignee: Fujitsu Limited, Kawasaki, Japan

[21] Appl. No.: 448,434

[22] Filed: Dec. 11, 1989

[30] Foreign Application Priority Data

Dec. 21, 1988 [JP] Japan .................. 63-323156

[51] Int. Cl.⁵ .................. G09G 1/06; G09G 1/16
[52] U.S. Cl. .................. 340/735; 340/730; 340/731
[58] Field of Search .............. 340/730, 731, 735, 747, 340/723, 799; 382/22, 34, 54; 364/518, 519, 520, 521

[56] References Cited

U.S. PATENT DOCUMENTS

| | | | |
|---|---|---|---|
| 4,408,198 | 10/1983 | Kudirka . | |
| 4,680,720 | 7/1987 | Yoshii et al. . | |
| 4,692,758 | 9/1987 | Fawcett et al. | 340/735 |
| 4,749,989 | 6/1988 | Carosso | 340/735 |
| 4,837,847 | 6/1989 | Shirasaka et al. | 382/22 |
| 4,897,638 | 1/1990 | Kokunishi et al. | 340/731 |
| 4,933,866 | 6/1990 | Markoff et al. | 340/735 |
| 4,959,801 | 9/1990 | Apley et al. | 364/521 |

FOREIGN PATENT DOCUMENTS

0284326 9/1988 European Pat. Off. .
2457616 12/1980 France .
60-83851 5/1985 Japan .

Primary Examiner—Ulysses Weldon
Assistant Examiner—M. Fatahiyar
Attorney, Agent, or Firm—Armstrong, Nikaido, Marmelstein, Kubovcik & Murray

[57] ABSTRACT

A method of and an apparatus for forming an outline character by making a character, numeral, mark, or the like black at the periphery thereof and white at the inner portions thereof. When the original character data exists at at least one upper or lower end in a dot display space, the character data at the end is removed and shortened. The shortened character dot pattern is periphally expanded by at least one dot, and the expanded character is removed to form white space within the shortened character. In another aspect, the character dot pattern is periphally expanded by at least one dot. When the original character exists at at least one upper or lower end in the dot display space, the expanded character is removed to form white spaces within the original character dot pattern except for an upper or lower end in the dot display space. Thus, if the original character dot pattern exists at at least one upper or lower end, a character completely enclosed within a black periphery can be obtained.

5 Claims, 13 Drawing Sheets

Fig. 1A
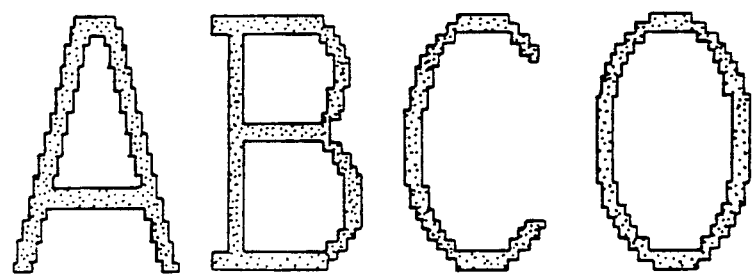
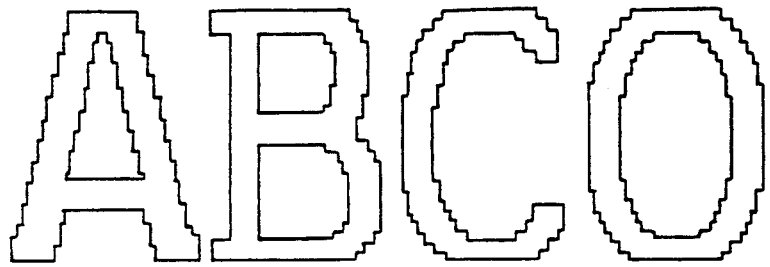
Fig. 1B

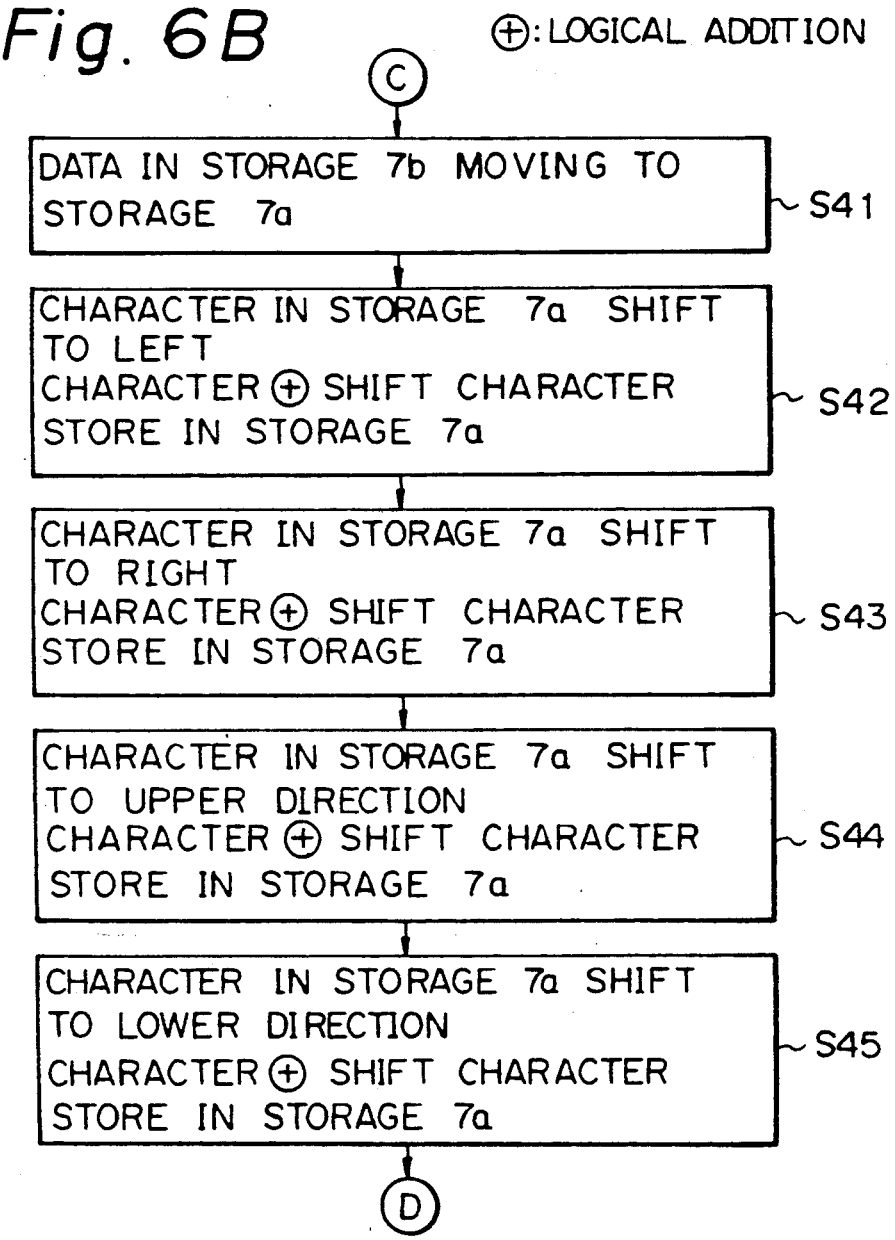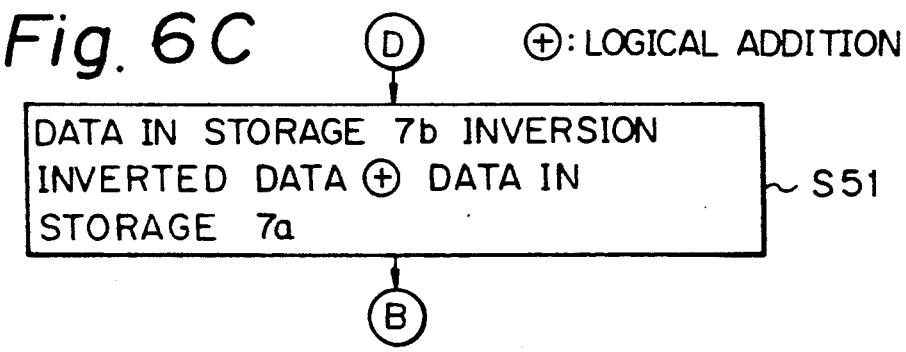

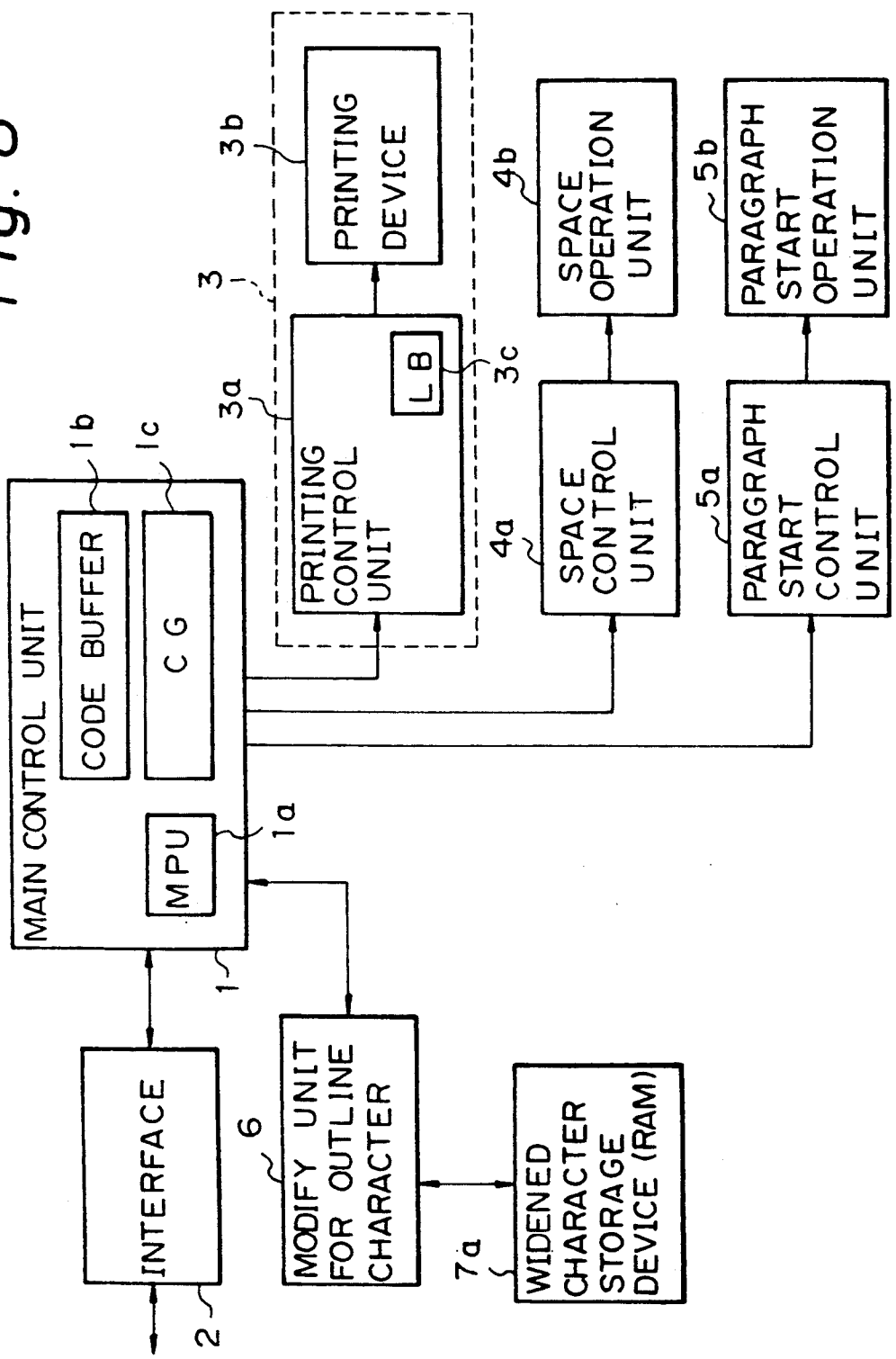

METHOD OF AND APPARATUS FOR FORMING OUTLINE CHARACTER

BACKGROUND OF THE INVENTION

1. Field of the Invention

The present invention relates to a method of and an apparatus for forming an outline character by processing ordinary characters, numerals, marks, etc. (hereinafter referred to as character(s)) in a display apparatus, e.g. printer, cathode ray tube, or the like.

2. Description of the Related Art

Generally, an ordinary form of characters is used in the display apparatus, but when the characters are modified, sometimes an outline character, i.e., a character from which the inner portions have been removed, to be displayed as a white space, is used. These outline characters are infrequently used, and therefore the preparation of specific character fonts for outline characters is disadvantageous from the economical viewpoint. Accordingly, when necessary, outline characters are formed by processing the fonts of ordinary characters memorized in a character generator.

As mentioned above, an outline character is formed by removing the inner portions thereof, to be displayed as a white space, and comprises peripheral portions encompassing the white spaces, and therefore, the outline character may be called an "encompassed" character.

In a conventional method of forming an outline character, first the character data is read from a character data storage means (i.e. character generator) storing the character data expressed as a dot pattern, the dot pattern of the character is then expanded peripherally by one dot, i.e., the character is widened, and subsequently, the widened character is whitened in conformance with the original character pattern.

In the conventional method of forming an outline character, however, since the widened character is removed, by the original character, which is not changed, the upper or lower periphery of the character is white and a closed or encompassed periphery thereof can not be obtained, if the original character reaches the upper or lower end of the dot display space as an underline or the like.

The following publication is related to this invention; Japanese Unexamined Patent Publication (Kokai) No. 60-83851.

SUMMARY OF THE INVENTION

Accordingly, an object of the present invention is to provide a method of and an apparatus for forming an outline character, wherein a periphery of the character is completely closed and a form of the character can be expressed more faithfully, even if the periphery of the original character reaches the upper or lower end of the dot display space.

To accomplish the above object, there is provided a method of forming an outline character comprising the steps of reading original character data from a character data storage means storing character data expressed by a dot pattern; shortening the original character data by eliminating an upper end or lower end in a dot display space of the original character data when the original character data exists at at least one end of the display space; expanding the dot pattern of the shortened original character by at least one dot toward the periphery thereof to widen the shortened original character; and removing the shortened character, to be displayed as a white space, from the widened character.

Further, there is provided another method of forming an outline character comprising the steps of reading original character data from a character data storage means storing character data expressed by a dot pattern; expanding the dot pattern of the read original character data by at least one dot toward the periphery thereof to widen the read original character; and removing the dot pattern of the original character data except for an upper or lower end in a dot display space to be made white from the widened character, when the original character data exists at least one upper or lower end of the display space.

Further, in the present invention, there is provided an apparatus for forming an outline character comprising a main control means including a microprocessor, a code buffer storing character codes from a host machine through an interface, and a character generator storing character font data expressing standard characters by a dot pattern and outputting character data upon receipt of an output of the code buffer, under the control of the microprocessor, a display means including a printing control means receiving the output of the main control means and a printing means for printing in accordance with an output signal from the printing control means, a modify means for an outline character for reading the font of standard characters from the character generator and forming the outline character, a widened character storage means connected to the modify means, and a shortened character storage means connected to the modify means; the modify means receiving a command to output an outline character from the main control means and reading the standard character from the character generator, the standard character being shortened when dot pattern of the standard character exists at at least one upper or lower end in a dot display space, the shortened character being stored in the shortened character storage means, the stored data being expanded, the expanded data being stored in the widened character storage means, and the modify means obtaining the outline character by processing data from the widened character storage means and the shortened character storage means.

Further, there is provided another apparatus for forming an outline character comprising a main control means including a microprocessor, a code buffer storing character code from a host machine through an interface, and a character generator storing character font data expressing standard characters by a dot pattern and outputting character data upon receipt of an output of the code buffer, under the control of the microprocessor, a display means including a printing control means receiving the output of the main control means and a printing means for printing in accordance with an output signal from the printing control means, a modify means for an outline character for reading the font of standard characters from the character generator and forming the outline character, and a widened character storage means connected to the modify means; the modify means receiving a command to output an outline character from the main control means and reading the standard character from the character generator, the standard character being expanded and stored in the widened character storage means, and the expanded character being processed with modified original character data to obtain the outline character.

Other features and advantages of the invention will be apparent from the following description given with reference to the accompanying drawings.

BRIEF DESCRIPTION OF THE DRAWINGS

FIGS. 1A and 1B show an example of outline characters formed according to the present invention;

FIGS. 6A, 6B and 6C are flowcharts of the processing for obtaining an outline character according to the first embodiment;

FIG. 8 is a block diagram of an apparatus for executing a method according to the second embodiment;

DESCRIPTION OF THE PREFERRED EMBODIMENTS

Embodiments of the present invention are explained below with reference to the drawings.

In the embodiments, the invention is applied, for example, to a printer in a computer, word processor, or the like, but this invention is not limited to these applications and can be applied to a CRT display device or other various display devices.

Further, in the following embodiments, although one character is expressed by a display space of 24×24 dots, this invention is not limited to the above condition and any display space can be applied.

First, in FIGS. 1A and 1B, an example of outline characters is shown in comparison to the standard characters.

Figure 2:
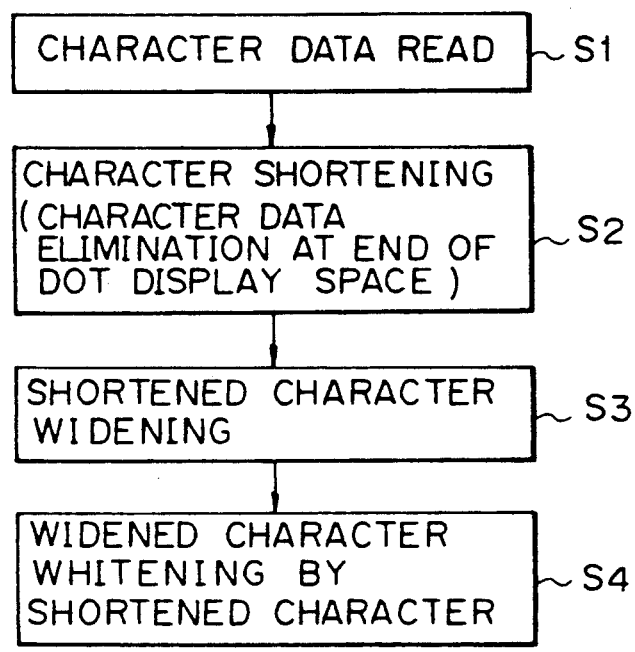
FIG. 2 is a flowchart summarizing the processing steps of a method according to a first embodiment of this invention.
Figure 3:
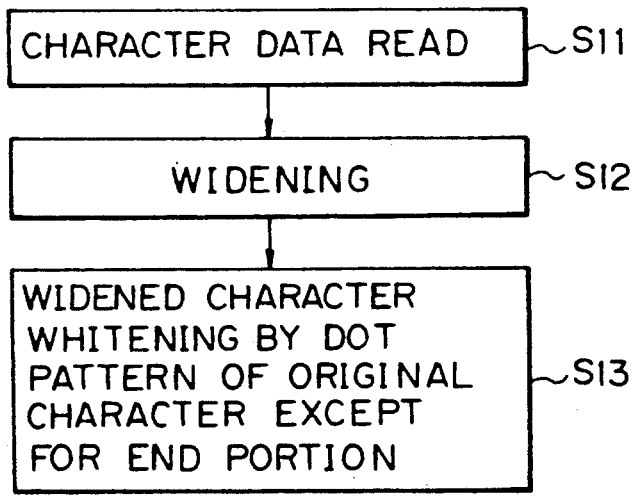
FIG. 3 is a flowchart summarizing the processing steps of a method according to a second embodiment of this invention.

FIG. 2 is a flowchart summarizing a first embodiment of the present invention, and FIG. 3 is a flowchart summarizing a second embodiment thereof.

Figure 4:
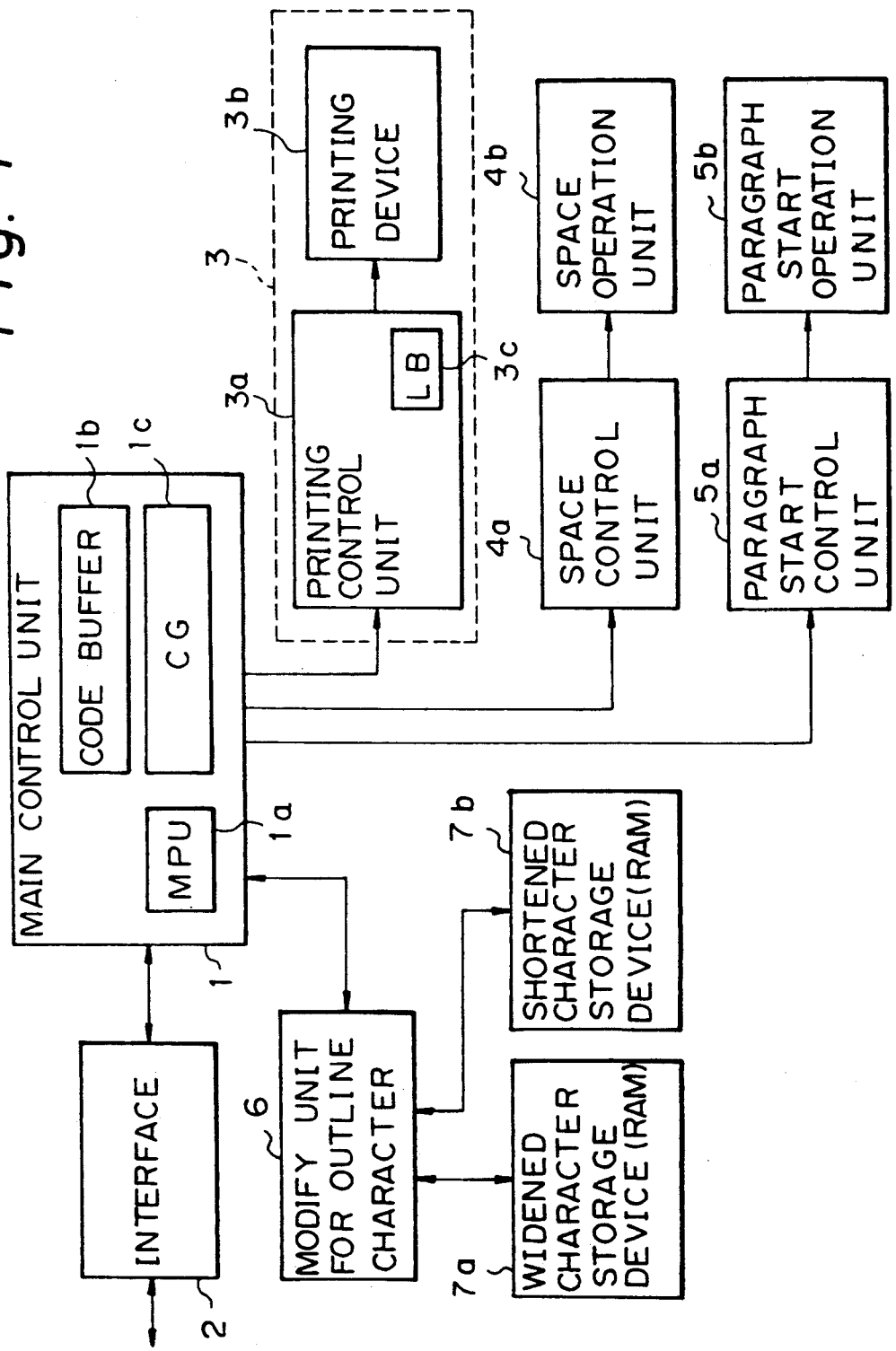
FIG. 4 shows a block diagram of an apparatus for executing a method according to the first embodiment.

FIG. 4 is a block diagram showing a constitution of an apparatus for executing the method of the first embodiment. As shown in the figure, the apparatus comprises a main control unit 1 composed of a microprocessor (MPU) 1a, a code buffer 1b storing character codes (e.g., by one page) input from a host machine, and a character generator (CG) 1c (character data storage means) storing character font data expressed by dot patterns of standard characters. The character generator 1c outputs character font data corresponding to an input character code, and the output character is in the form of a black standard character. An interface 2 outputs a signal to the host machine from the main control unit 1 or receives the input of a signal from the host machine.

A display means 3 displays the characters and comprises a printing control unit 3a and a printing device 3b for printing the characters upon receipt of a signal output from the printing control unit 3a. A line buffer (LB) 3c storing one line of the font data is provided in the printing control unit 3a.

A space control unit 4a controls a movement in the printing direction, and a space operation unit 4b is operated by a signal output from the space control unit 4a. A paragraph start control unit 5a controls a start of a new paragraph in the printing, and a paragraph start operation unit 5b starts a new paragraph upon receipt of a signal output from the paragraph start control unit 5a.

A modify unit 6 for the outline character reads the font of the standard characters from the character generator 1c and forms an outline character corresponding to the standard character. The modify unit is connected to a widened character storage device (RAM) 7a and to a shortened character storage device (RAM) 7b, necessary in a processing step of forming the outline character.

Figure 5:
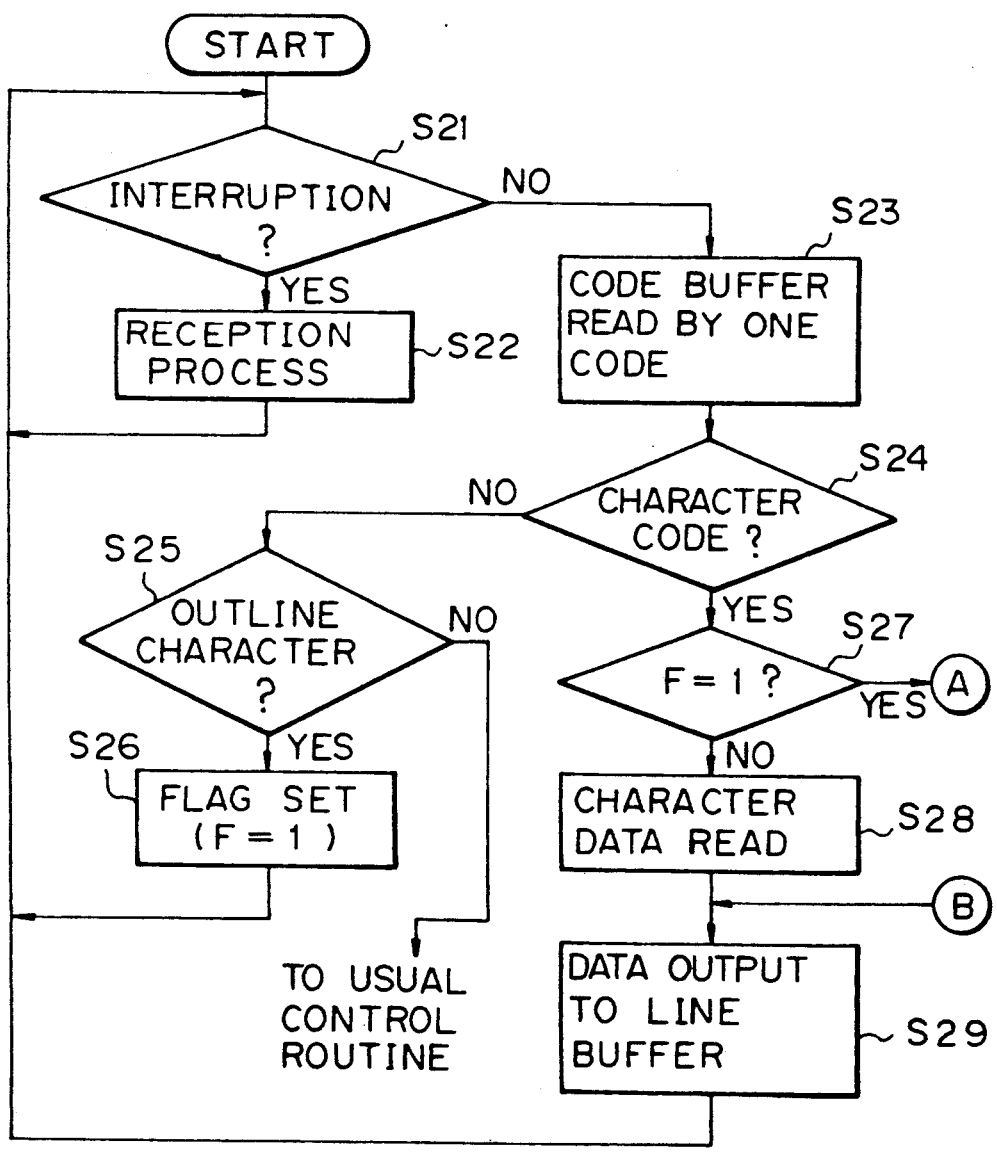
FIG. 5 is a flowchart of a processing carried out in a main control unit of the apparatus of FIG. 4.

FIG. 5 is a flowchart of the processing carried out in the main control unit 1, wherein S21 to S29 are processing steps.

First, at S21, it is determined whether or not an interruption from the host machine has occurred. If an interruption has occurred, a predetermined receiving processing is executed at S22, i.e., an input code is stored in the code buffer 1b and other processes are carried out, and the processing then returns to S21.

If an interruption has not occurred at S21, one code is read from the code buffer 1b at S23, and in S24 it is determined whether or not the code is a character code. If the code is not a character code, since the code is a control code, it is determined whether the code is an instruction to form an outline character, at S25. If the code is not an outline character forming instruction, the process goes to the predetermined control routine for processing another control code instruction. If the code is an outline character control instruction, a flag is set (i.e., F=1) and the process returns to S21.

If the code read at S23 is determined to be a character code at S24. The flag state (F=1) is determined at S27. If F=1, the process goes to an outline character forming routine in FIG. 6A. At S27, if F is not "1", character data corresponding to the character code is read from the character generator 1C at S28, the character data is sent to the line buffer 3c at S29, and the process returns to S21.

Figure 6A:
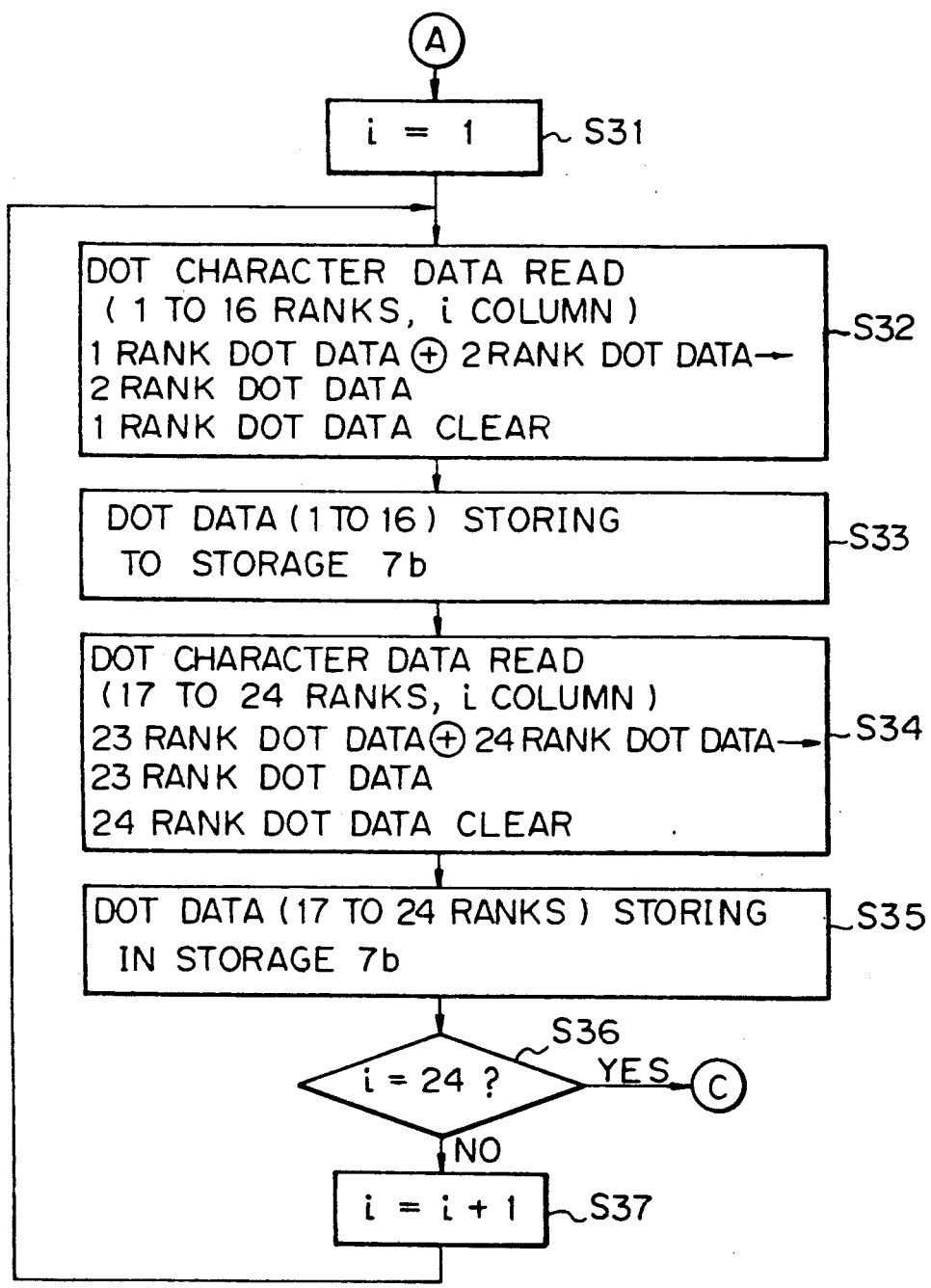

FIGS. 6A to 6C are processing flowcharts, including steps S32 to S37, steps S41 to S45, and step S51, of the forming of an outline character in the modify unit 6 according to the first embodiment of this invention. The processing is executed when F=1 at S27 of FIG. 5. In the following explanation, dots expressing characters are shown by a black circle, and these dots are handled as "1" during the operation. A dot not expressing the character is handled as "0".

Figure 7A:
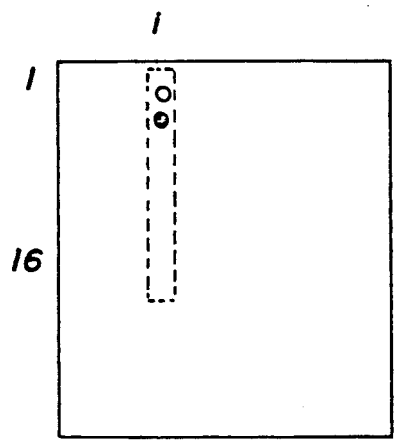
FIGS. 7A, 7B, 7C, 7D, 7E, 7F, 7G, and 7H are diagrams explaining the processing steps for obtaining the outline characters according to the first embodiment.

At this stage, first a counter is set to "1", i.e., i=1 at S31. Letter i shows a column number. The dot character data from the first to the 16th ranks, which is defined as a first block, in an ith column (in initial, start from first column) is read from the character generator 1c at S32, the dot data of the first and the second ranks are logically added, and the result becomes the second rank dot data: The first rank dot data are cleared. As a result, as shown for example in FIG. 7A, when the dot of the character pattern exists in either the first rank or the second rank of the ith column, the second rank dot becomes the dot of the character pattern and the first rank dot is cleared. Then, at S33, the dot data of the first block are stored in the shortened character storage device (RAM) 7b.

Figure 7B:
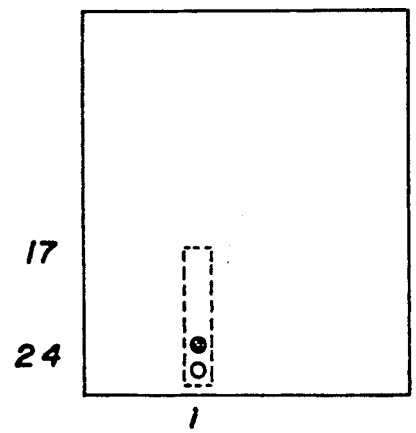

Next, at S34, the dot character data from the 17th to the 24th ranks, which is defined as a second block, in ith column are read from the character generator 1c, the dot data of the 23rd and 24th ranks are logically added, and the result becomes the 23rd dot data: The 24th rank dot data is cleared. Thus, for example, as shown in FIG. 7B, if the dot of character pattern of either the 23rd or 24th rank of the ith column exists, the 23rd rank dot becomes the dot of the character pattern, and the 24th rank dot is cleared. Then, at S35, the second block dot data is stored in the shortened character storage unit 7b.

Accordingly, in the ith column, when the character data has the dot(s) of first and/or 24th ranks, i.e., at upper end and/or lower end of the display space, the end dot is removed from the character data. Thus, at S36, it is determined whether the value of the counter for i is 24, if i does not equal 24, i is incremented by 1 (i.e., i=i+1), and the processes after S32 is repeated and the column is incremented by one until i=24.

Figure 7C:
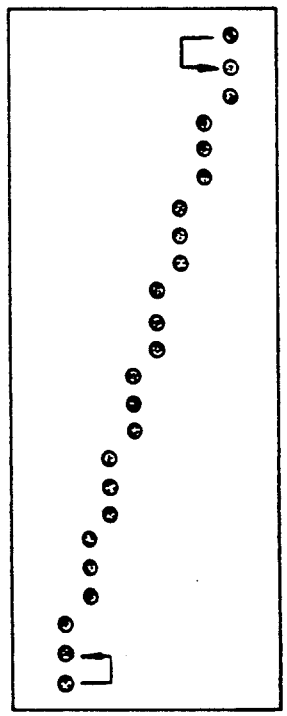

In S36, if i=24, all of the processes in the display space of 24×24 dots are completed. That is, if the character data exists at the upper and/or lower end(s) of the dot display space, the end dots (first or 24th rank dot) are removed from the character data, and as shown by arrows in FIG. 7C, the characters are shortened.

Figure 7D:
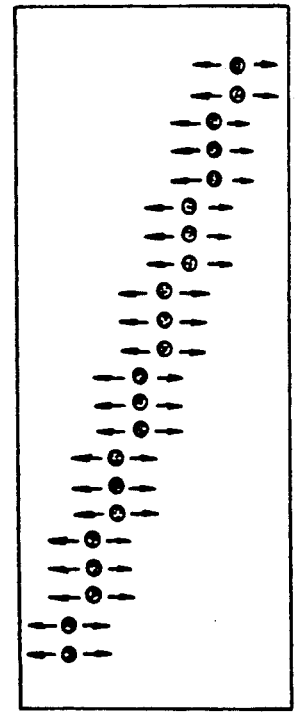

Accordingly at S36, when i=24 first the character data in the shortened character storage device 7b is stored in the widened character storage device 7a at S41, then at S42, the character data in the widened character storage unit 7a is read, for example, the characters are shifted to the left by one dot, the shifted data is added logically to the data in the character storage device 7a, and the results stored in the widened character storage device 7a. Then, at S43, as in the process step at S42, for example, the read characters are shifted to the right by one bit, and the shifted data is added logically to the data in the widened character storage device 7a, and the results stored in the widened character storage device 7a. Thus, for example, the pattern in FIG. 7D is expanded to the right and left as shown in FIG. 7E.

Figure 7H:
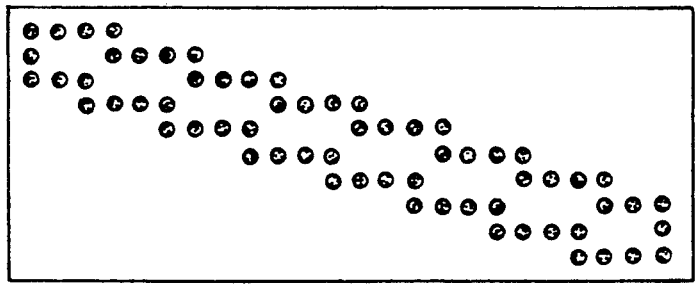
Figure 7G:
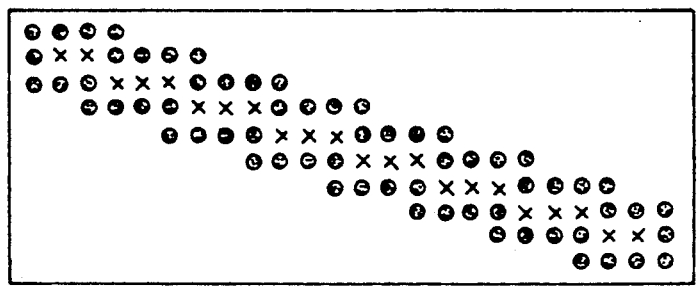
Figure 7F:
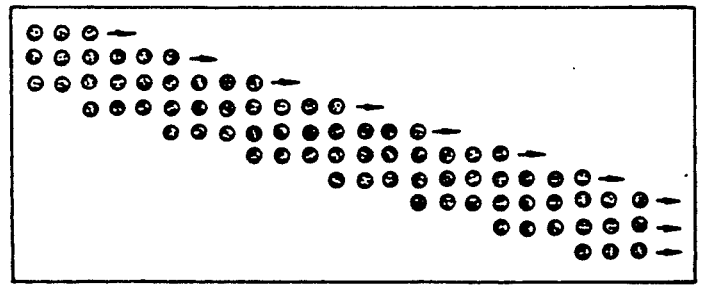
Figure 7E:
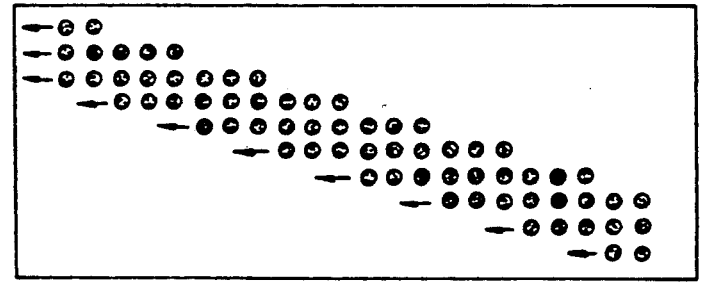

Subsequently, at S44 and S45, as in the above process and as shown in FIGS. 7E and 7F, the character in the widened character storage device 7a is expanded step by step in the upper and lower directions, and as a result, the character dot pattern is periphally expanded one dot by one dot, and the widened character is formed and stored in the widened character storage device 7a.

Finally, at S51, the shortened character data is read from the shortened character storage device 7b, all of the dot data is inverted, and the inverted data is multiplied logically with the data of the widened character storage device 7a. Thus the widened character is removed to form white spaces at the X mark portions (shortened character portions) in FIG. 7G, and as shown in FIG. 7H, the outline character in which the upper and/or lower end(s) (first and 24th ranks dot) are not white and which has a closed black periphery is formed. After this processing, the processing returns to S29 in FIG. 5 and the data is output to the line buffer 3c.

FIG. 8 shows a block diagram of an apparatus for executing a method according to a second embodiment of the present invention. The apparatus is the same as the apparatus of the first embodiment, except that the shortened character storage device 7b is omitted, and therefore, an explanation thereof is abbreviated. Also, the process in the main control unit 1 is the same as that of FIG. 5, and thus the explanation thereof is abbreviated accordingly.

Figure 9A:
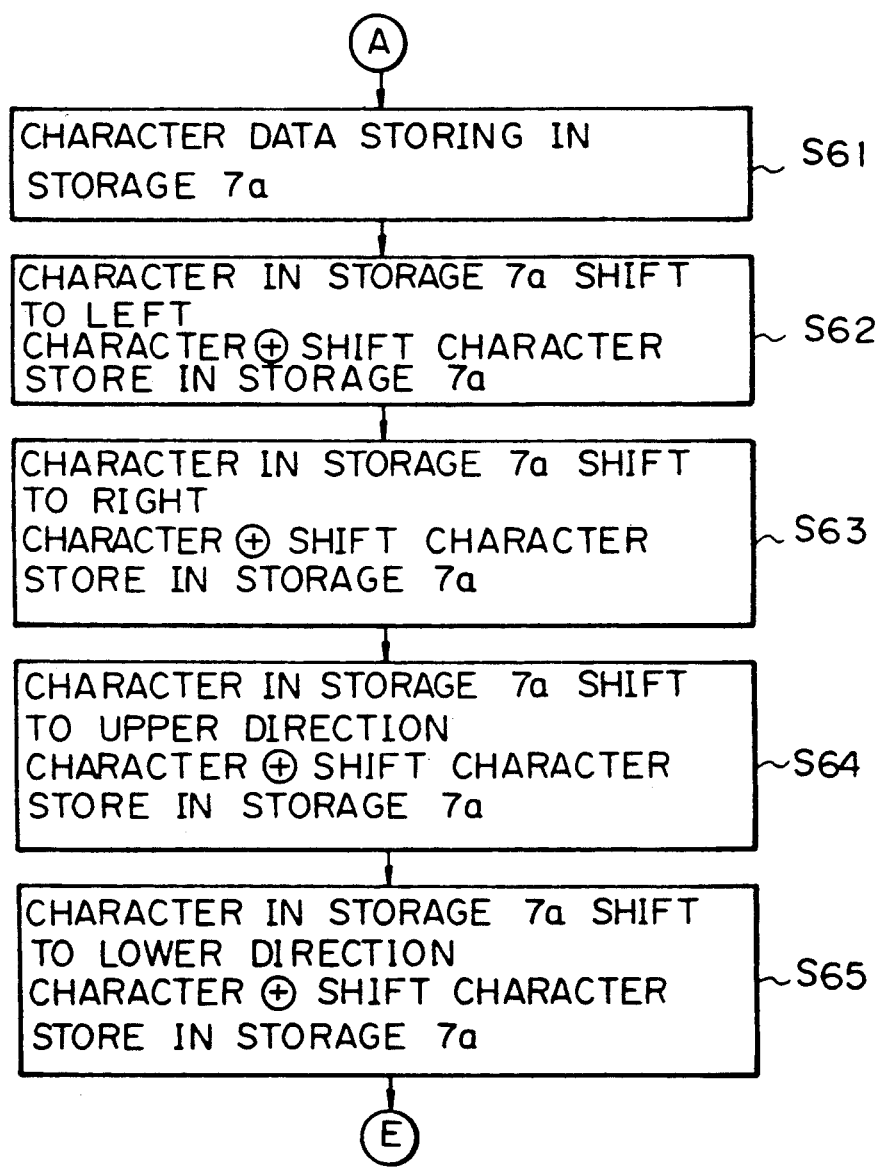
FIGS. 9A and 9B are flowcharts of the processing for obtaining an outline character according to the second embodiment.
Figure 9B:
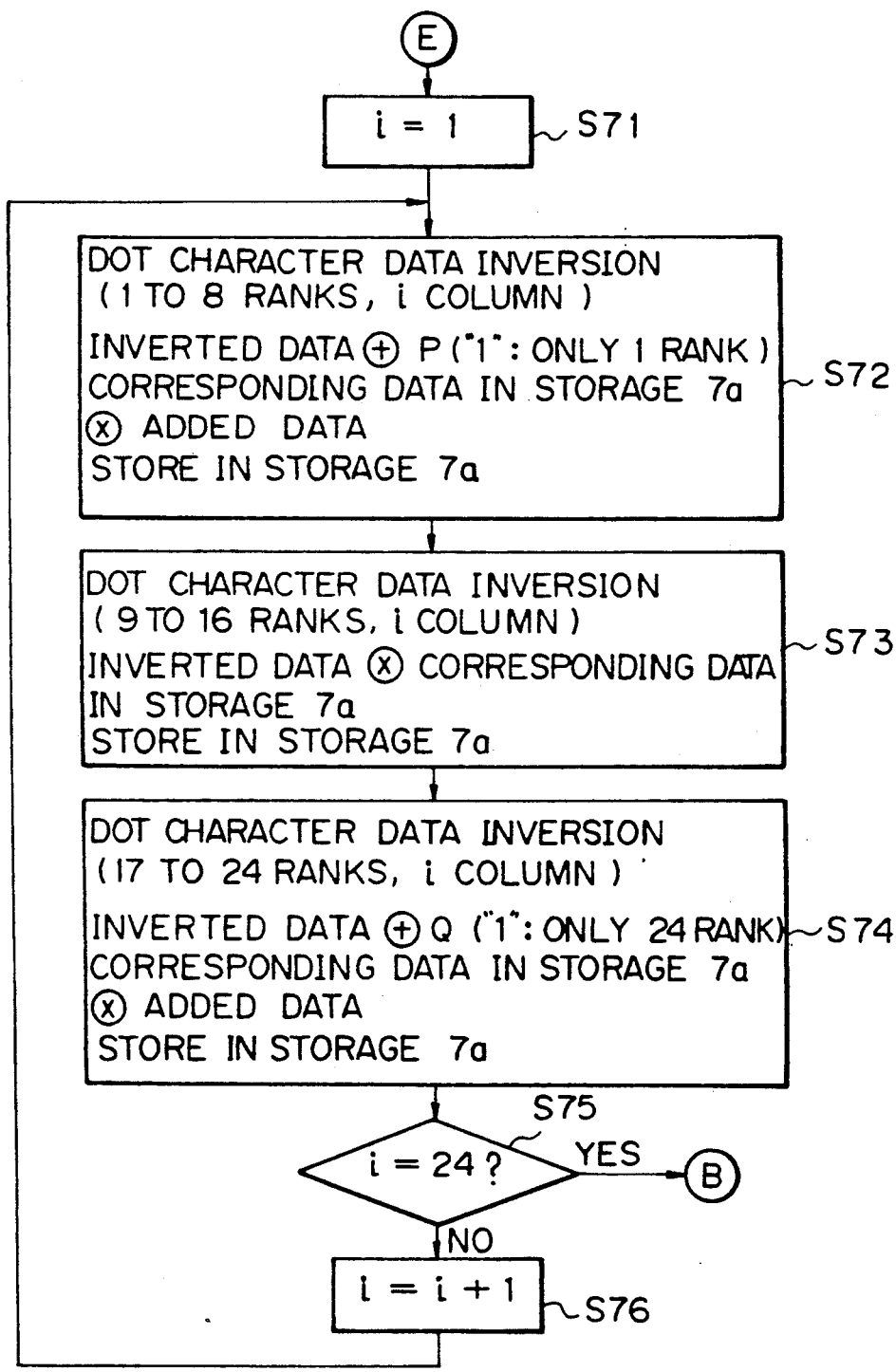

FIGS. 9A and 9B are flowcharts, including steps S61 to S65 and steps S71 to S76, of the processing of the method of the second embodiment, which are executed when F=1 at S27 of FIG. 5.

Figure 10D:
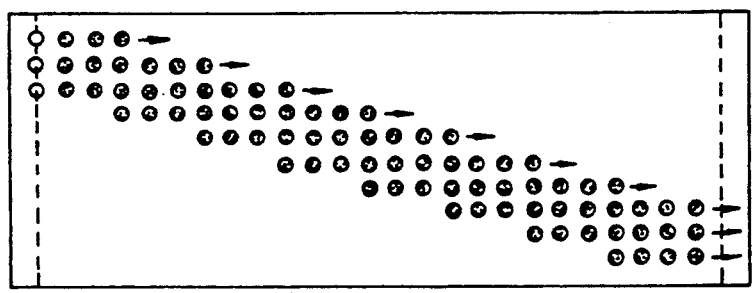
FIGS. 10A, 10B, 10C, 10D, 10E, 10F, and 10G are diagrams explaining the processing steps for obtaining the outline characters according to the second embodiment.
Figure 10C:
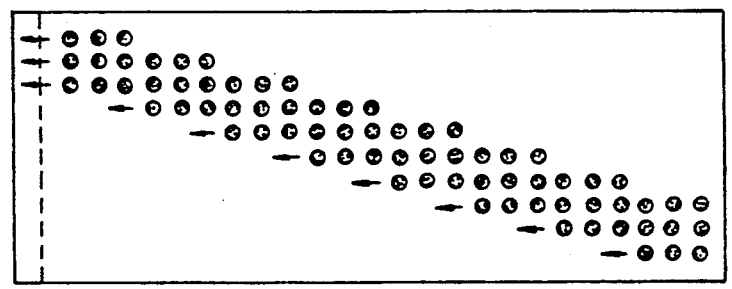
Figure 10B:
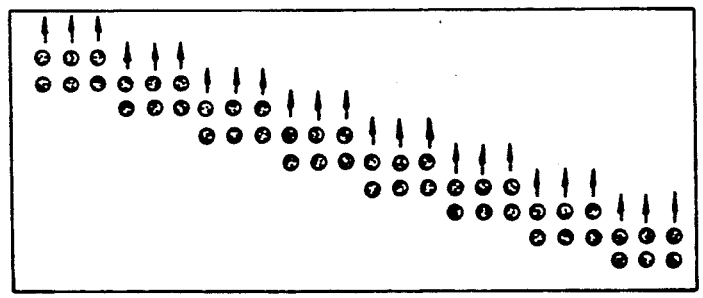
Figure 10A:
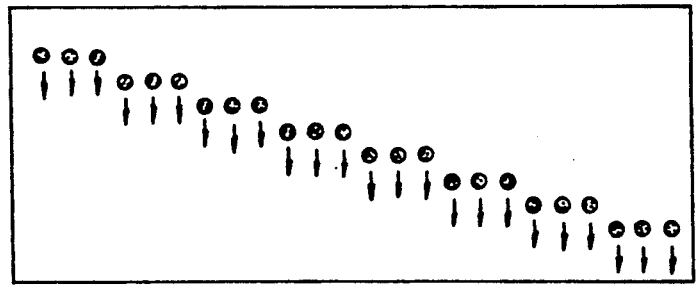

First, at S61, character data is read from a character generator 1c and stored in a widened character storage device 7a. Then, at S62, the character data in the widened character storage device 7a is read and the read character data shifted to the left, e.g., by one dot, the shifted data is added logically with the data in the widened character storage device 7a, and the results stored in the widened character storage device 7a. Thus, for example, the pattern shown in FIG. 10A is widened as shown in FIG. 10B. At S63, as at S62, the data read from the widened character storage device 7a is shifted to the right, e.g., by one dot, and the shifted data is added logically with the data in the widened character storage device 7a, and the results stored in the widened character storage device 7a. As a result, the pattern shown in FIG. 10B is widened as shown in FIG. 10C.

Subsequently, at S64 and S65, as in FIGS. 10C and 10D, the character data is widened in the upper and lower directions, whereby a widened character, which has been periphally expanded by one bit in the dot pattern thereof, is formed and stored in the widened character storage device 7a.

Further, in this embodiment, the dots at the upper and lower ends in the dot display space are expanded until they are outside the space (broken lines in FIGS. 10C, 10D, 10F, and 10G). The dots expanded until they are outside the space are shown by white circles in FIG. 10D. The portions expanded until they are outside the space are invalid.

Figure 10E:
Figure 10F:
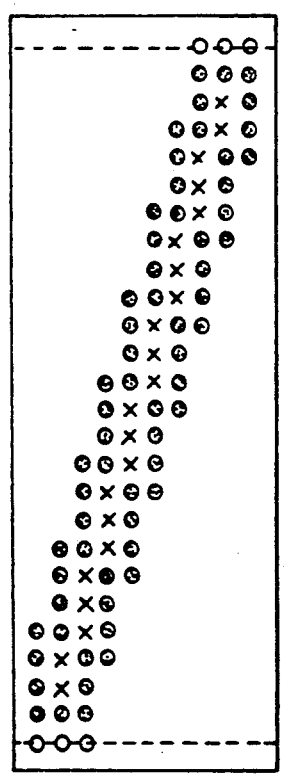

Next, at S71, a counter is set to "1" (i.e., i=1), and at S72, the dot data in the first to 8th ranks, which is defined as a first block, in the ith column (initially, start from first column) is read from the character generator 1c and inverted. The inverted data is added logically with a constant P (FIG. 10E) comprising the first block dots, only the first rank of which is "1" (i.e. black circle), and then the sum of the added dot data is multiplied logically with the corresponding dot data in the widened character storage 7a, and the results stored in the widened character storage device 7a.

Subsequently, at S73, the dot data of the 9th to 16th ranks which is defined as a second block in ith column is read from the character generator 1c, the read data is inverted, the inverted data is multiplied logically with the corresponding dot data in the widened character storage 7a, and the results stored in the widened character storage device 7a.

Finally, at S74, the dot character data of the 17th to 24th ranks which is defined as a third block in ith column is read from the character generator 1c and inverted, and the inverted data added logically with a constant Q (FIG. 10E) comprising dots of the third block, only 24th ranks of which is "1" i.e., the block circle. Then the added data is multiplied logically with the corresponding the third block in ith column data in the widened character storage device 7a, and results are stored in the widened character storage device 7a.

Accordingly, the processing for the forming of the outline character in the ith column is completed. Here, at S75, it is determined whether the counter value is 24, and if i is not 24, the i is added with 1 at S76 and the process goes to following columns, one by one, and repeats the steps after S72.

Figure 10G:
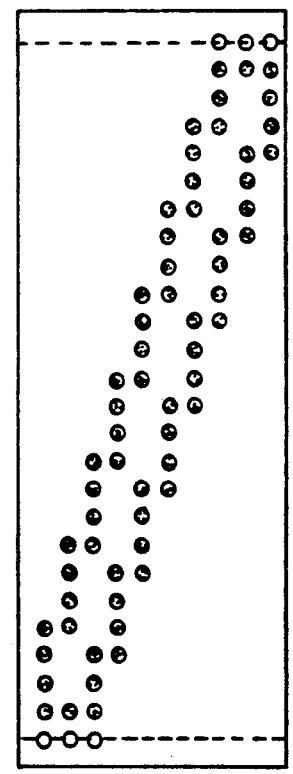

As mentioned above, at S75, when i=24 the processing for all of the columns is completed. That is, even if the original character data stored in the character generator 1c exists at the upper or lower end in the dot display space (first or 24th rank dot), as shown by an X mark in FIG. 10F, the widened character is removed to form a white space within the dot pattern of the original character eliminated the upper and lower ends dot, and as shown in FIG. 10G, the outline character is formed which is not white at the upper and lower ends and which has a closed black periphery. Finally, when i=24 at S75, the process returns to S29 in FIG. 5, and the data is output to the line buffer 3c.

In the above embodiments, the width of the original character is one dot, but this invention is not limited to a one dot width; namely, the character width may be more than one dot. Further, when the widened character is formed, the dot pattern may be periphally expanded to more than one dot.

By using the first embodiment, if the character data read from the character data storage device exists at the upper or lower end of the dot display space, the character data at the ends is eliminated, and a shortened character which does not reach the upper or lower end is obtained. If the shortened character is widened, the widened character becomes wider in the upper and lower directions compared with the shortened character in the dot display space.

Accordingly, the above shortened character is removed from the widened character to form a white space, and then the portions of the character at the ends of the dot display space are not removed, and thus a black closed periphery of the widened character can be displayed.

By using the second embodiment, first the widened character is formed by the character data read from the data storage device. When the original character data exists at the upper or lower end in the dot display space, the widened character is outside of the dot display space. In this case, the widened character is defined within the dot display space. Then, the widened character is removed, to form a white space, according to the dot pattern, except for the upper and lower ends of the original character data, thus, the upper and lower ends in the dot display space are not removed, to form a white space, and an outline character having a closed periphery at the ends thereof can be obtained.

What is claimed is:

1. A method of forming an outline character comprising steps of:
   reading an original character data from a character data storage means storing character data expressed by a dot pattern;
   shortening the original character data by removing the data from an upper end or lower end of a dot display space of the original character data when the original character data exists at at least one upper or lower end of the display space;
   periphally expanding the dot pattern of the shortened original character by at least one dot to widen the shortened original character; and
   removing the shortened character to form white space from the widened character.

2. A method as set forth in claim 1, wherein, when said dot display space is 24×24 dots, said shortening step comprises steps of:
   reading a first block of the character data including first to 16th ranks in ith column, logically adding dot data of the first rank and dot data of the second rank, replacing the data of the second rank with the sum of the added data, and clearing the data of the first rank,
   storing the dot data of the first block in a shortened character storage means,
   reading a second block of the character data including 17th to 24th ranks in the ith column, logically adding dot data of the 23rd rank and dot data of the 24th rank, replacing the data of the 23rd rank with the sum of the added data, and clearing the data of the 24th rank,
   storing the dot data of the second block in the shortened character storage means,
   repeating the above steps to replace the column from the first to 24th.

3. A method as set forth in claim 2, wherein said expanding step comprises steps of:
   storing data from a shortened character storage means in a widened character storage means,
   shifting data from a widened character storage means to the left, logically adding data from the widened character storage means with the left shifted data, and storing the sum of the addition in the widened character storage means,
   shifting data from the widened character storage means to the right, logically adding the data from the widened character storage means with the right shifted data, and storing the sum of the addition in the widened character storage means,
   shifting data from the widened character storage means in the upper direction of the display space, logically adding the data from the widened character storage means with the upper shifted data, and storing the sum of the addition in the widened character storage means, and
   shifting data from the widened character storage means in the lower direction of the display space, logically adding the data from the widened character storage means with the lower shifted data, and storing the sum of the addition in the widened character storage means.

4. A method as set forth in claim 3, wherein said removing step comprises steps of:
   inverting data from a shortened character storage means, and
   logically multiplying the inverted data with the data from the widened character storage means.

5. An apparatus for forming an outline character comprising:
   a main control means including a microprocessor, a code buffer storing character codes from a host machine through an interface, and a character generator storing character font data expressing standard characters by dot patterns and outputting the character data upon receipt of a signal output by the code buffer under the control of the microprocessor;
   a display means including a printing control means receiving the signal output by the main control means and a printing means for printing in accordance with a signal output from the printing control means;

a modify means for an outline character for reading the font of standard characters from the character generator and forming the outline character;

a widened character storage means connected to the modify means for storing a character widened by said modify means; and a shortened character storage means connected to the modify means for storing a character shortened by said modify means;

said modify means receiving a command to output an outline character from the main control means and reading the standard character from the character generator, the standard character being shortened by said modify means when a dot pattern of the standard character exists at at least one upper or lower end in a dot display space, the shortened character being stored in the shortened character storage means, the stored data being expanded by said modify means, the expanded data being stored in the widened character storage means, and the outline character is obtained by processing of data from the widened character storage means and the shortened character storage means through the modify means to output an outline character.

* * * * *